United States Patent [19]

Hawk

[11] 4,070,785
[45] Jan. 31, 1978

[54] FISHING LINE GUIDE DEVICE

[76] Inventor: Cortez Hawk, 2214 Sycamore, Anaheim, Calif. 92806

[21] Appl. No.: 700,772

[22] Filed: June 29, 1976

[51] Int. Cl.² ............................................. A01K 87/04
[52] U.S. Cl. .................................. 43/24; 242/84.1 R; 242/157 R
[58] Field of Search ..................... 43/24, 25, 18 R, 19; 24/230 F, 201 R, 201 S; 242/84.2 D, 84.2 E, 84.4

[56] References Cited

U.S. PATENT DOCUMENTS

| 2,623,317 | 12/1952 | De Maria | 43/24 |
| 3,063,186 | 11/1962 | Ward | 43/24 |
| 3,608,226 | 9/1971 | Stanley | 43/24 |
| 3,769,735 | 11/1973 | Cousin | 43/24 |

Primary Examiner—Jay N. Eskovitz
Assistant Examiner—Robert P. Swiatek

[57] ABSTRACT

A fishing line guide device is provided which comprises a base coil attached to a fishing pole. A looped metal rod line guide is removably attached to the base coil and contains a loop through which the fishing line is contained. The line guide pivots about the base coil so that the fishing line is always contained within the line guide loop.

4 Claims, 4 Drawing Figures

FISHING LINE GUIDE DEVICE

BACKGROUND OF THE INVENTION

The present invention relates to a fishing line guide device used to contain and guide a fishing line used with a fishing pole and reel.

One problem which exists in the use of fishing rod and reels is that the line tends to pile up in one or more spots on the reel. This causes the line to either snag, break or otherwise foul and causes great irritation and problems for the fisherman, particularly in deep water fishing.

The device of this invention aids in guiding the line so that there is a smooth operation. The line normally does not touch the invention herein and the invention herein does not inhibit the freedom of the line to move.

Accordingly, the main object of the invention is providing a device to assist in guiding a fishing line to the reel. Another object of the invention is to prohibit line build-up and fouling in a fishing line. Other objects of the invention will be apparent from the following description.

DESCRIPTION OF THE INVENTION

The device of the invention herein comprises two pieces of metal rod, preferably stainless steel rods. One piece, termed the "base coil" is comprised of a multitude of coils in the middle of the rod with straight portions on the ends of the rod. The straight ends can be attached to a clamp or other device on the fishing pole and hence, have the function of attaching the base coil to the fishing pole. The middle coiled portion provides a place for the "line guide," described hereinafter, to be inserted within the coil. The arrangement whereunder the line guide is inserted in the coil permits the line guide to rotate about the base coil.

The second metal rod is shaped with a looped portion in the middle of the rod, with straight portions paralleling each other and terminating in end portions 90° of the straight portions. The end portion inserts into the base coil described above. The loop provides the tension in the line guide for the line guide to be attached to the base coil.

The fishing line is inserted within the loop of the line guide. The line guide can thus rotate about the base coil which is stably attached to the fishing pole. The line guide is pivotably inserted and attached to the base coil so that the fishing line has freedom of movement but is yet kept within the loop of the line guide.

In the above fashion, it can be seen that the fishing line is always guided and fouling is eliminated.

The foregoing aspects of the invention can be illustrated by reference to the following drawings.

Figure 1:
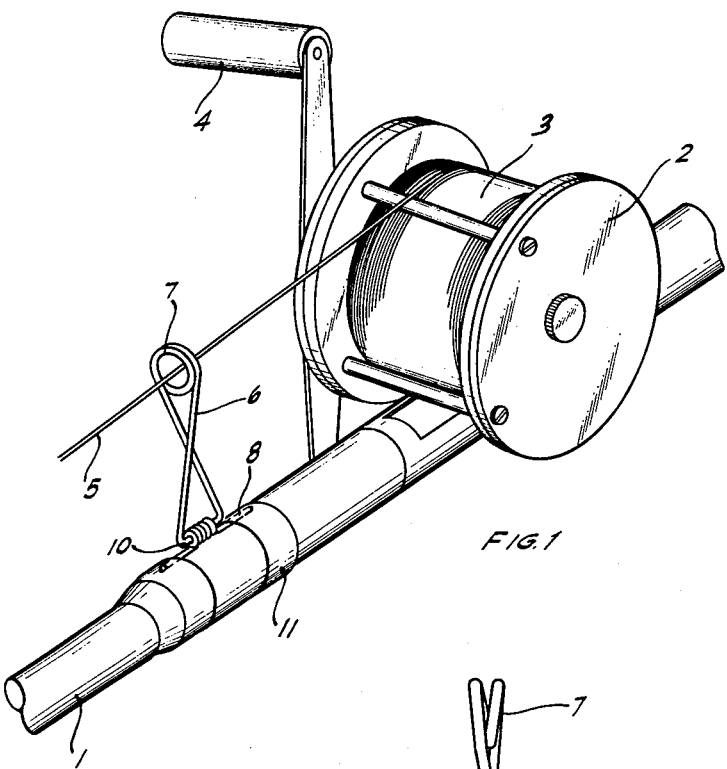
FIG. 1 illustrates the line guide device attached to the fishing pole.

FIG. 1 shows the device attached to the fishing pole 1 with the fishing line 5 contained within the loop 7 of the line guide. Reel 2 with the line winding 3 is attached to the fishing pole and handle 4 is utilized with the reel to wind the line 5. It can be seen from FIG. 1 that the line 5 travels laterally across the reel 2. The loop 7 rotates about the base coil 9 so that the line 5 has complete freedom of movement but that use of the line guide avoids fouling of the line.

The straight portion of the base coil 8 is inserted within a brace, clamp or bracket shown as 11. Other similar means can be used to attach the straight portion of the base coil to the fishing pole 1.

Figure 2:
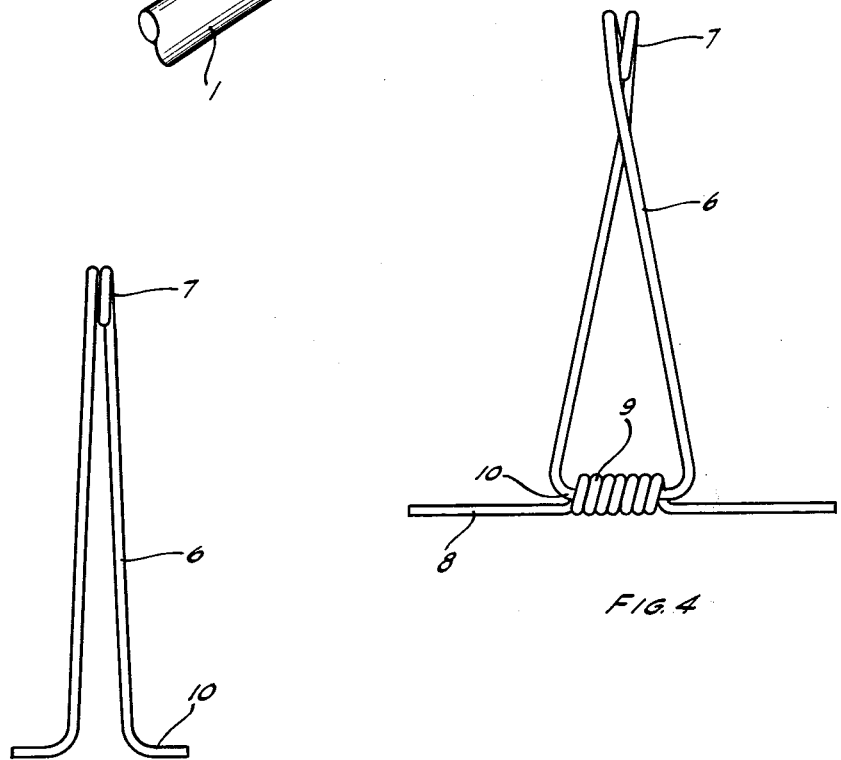
FIG. 2 is a side view of the looped metal rod line guide.

FIG. 2 illustrates the "line guide" which is composed of a middle loop 7, straight portions 6 and an end portion 10. The straight portions are substantially parallel to each other when standing free. In such a position, the end portions point in opposite directions and 90° to the straight portions. The end portions 10 are insertable within the coil 9 of the base coil by pushing the straight portion 6 towards each other so that they cross one another and the coil is in tension with the straight portions crossing one another. The end portions 10 simply insert within the loops of the base coil. The "line guide" can be taken out of the base coil by pulling the straight portions apart from the base coil.

Figure 3:
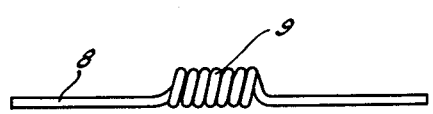
FIG. 3 is a side view of the base coil portion of the line guide device.

FIG. 3 illustrates the base coil which is essentially composed of a coiled portion 9 and two straight portions 8 about the middle coil portion 9.

Straight portion 8 inserts within a clamp or bracket 11 which can be attached to the fishing pole.

Figure 4:
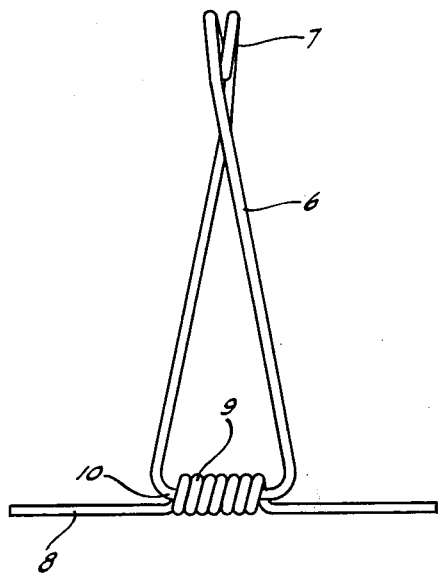
FIG. 4 illustrates the line guide device attached to the base coil.

FIG. 4 shows the line guide attached to the base coil. It can be seen that when the line guide is attached to the base coil, it is in tension with the straight portion 6 crossing each other. The ends 10 simply insert within the coil 9 of the base coil. The end 10 rotates or pivots within the base coil so that the line guide is free to move back and forth. It can be seen that the line 5 is parallel to the coiled portion of the base coil.

When the reel and rod are not used, the device of the invention can be simply removed from the pole and stored as are other tackle in a simple tackle box.

I claim:

1. A fishing line guide device comprising:
    a. a base coil comprising a coiled metal rod portion and straight metal rod portions on either side of said coiled portion;
    b. a line guide removably attached to said base coil comprised of a looped metal rod having straight portions on either side of a looped portion and end portions at approximately 90° to the straight portions, with the line guide having the shape so that the said end portions can be inserted within the coil of the base coil and pivotable about said coil; and
    c. means for attaching the straight metal rod portions of the base coil to a fishing rod.

2. The device of claim 1 wherein the coiled metal rod portion of the base coil contains over three coils and the looped portion of the line guide contains one loop.

3. The device of claim 1 wherein the straight portions of the line guide are approximately parallel when free standing.

4. The device of claim 1 wherein the base coil is adjacent to a reel on a fishing rod.

* * * * *